(12) United States Patent
Hellring et al.

(10) Patent No.: US 7,632,563 B2
(45) Date of Patent: Dec. 15, 2009

(54) TRANSPARENT COMPOSITE ARTICLES

(75) Inventors: Stuart D. Hellring, Pittsburgh, PA (US); Kaliappa G. Ragunathan, Gibsonia, PA (US); Thomas G. Rakavina, New Kensington, PA (US); Victoria A. Trette, Freeport, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 176 days.

(21) Appl. No.: 11/610,755

(22) Filed: Dec. 14, 2006

(65) Prior Publication Data

US 2008/0145638 A1  Jun. 19, 2008

(51) Int. Cl.
B32B 27/04 (2006.01)
C08K 7/02 (2006.01)
C08L 75/00 (2006.01)

(52) U.S. Cl. .................... 428/297.4; 524/261; 525/123

(58) Field of Classification Search ................ 428/297; 977/778, 779
See application file for complete search history.

(56) References Cited

U.S. PATENT DOCUMENTS

| | | | |
|---|---|---|---|
| 3,538,700 | A | 11/1970 | Hofer |
| 6,110,588 | A | 8/2000 | Perez et al. |
| 6,265,333 | B1 | 7/2001 | Dzenis et al. ............... 442/346 |
| 6,495,680 | B1* | 12/2002 | Gong ......................... 540/456 |
| 6,583,214 | B1* | 6/2003 | Haeberle et al. ............. 524/589 |
| 6,713,011 | B2 | 3/2004 | Chu et al. .................... 264/465 |
| 7,105,124 | B2 | 9/2006 | Choi ........................... 264/465 |
| 2006/0024483 | A1 | 2/2006 | Koch et al. ............... 428/292.1 |
| 2006/0173397 | A1* | 8/2006 | Tu et al. ......................... 604/8 |
| 2006/0240218 | A1* | 10/2006 | Parce .......................... 428/98 |
| 2007/0066717 | A1* | 3/2007 | Nazri et al. ................. 523/200 |
| 2007/0144124 | A1* | 6/2007 | Schewe et al. ................ 55/487 |

FOREIGN PATENT DOCUMENTS

| | | |
|---|---|---|
| WO | 02/40255 A2 | 5/2002 |
| WO | 02/074533 A2 | 9/2002 |
| WO | 2007/117296 A2 | 10/2007 |
| WO | 2007/117296 A2 | 11/2007 |

OTHER PUBLICATIONS

Applied Sciences, Inc. Product Bulletin, http://www.apsci.com/home.html. 2001.*
Electrospinning of Nanofibers: Reinventing the Wheel? by Dan Li and Younan Xia; *Advanced Materials* 2004, 16, No. 14, Jul. 19, 1151-1169.
A review on polymer nanofibers by electrospinning and their applications in nanocomposites by Zheng-Ming Huang, Y. -Z. Zhang, M. Kotaki, S. Ramakrishna; *Composites Science and Technology* 63 (2003) 2223-2253.
Processing and Structure Relationships in Electrospinning of Ceramic Fiber Systems by Wolfgang Sigmund, Junhan Yuh, Hyun Park, Vasana Maneeratana, Georgios Pyrgiotakis, Amit Daga, Joshua Taylor, and Juan C. Nino; *Journal of the American Ceramic Society* 89 [2] 395-407 (2006).
In Situ Photo-Cross-Linking of Cinnamate Functionalized Poly(methyl methacrylate-*co*-2-hydroxyethyl acrylate) Fibers during Electrospinning by Pankaj Gupta, Scott R. Trenor, Timothy E. Long, and Garth L. Wilkes; *Macromolecules* 2004, 37, 9211-9218.
Mechanical Properties of Composites Using Ultrafine Electrospun Fibers by Jong-Sang Kim and Darrell H. Reneker; *Polymer Composites*, Feb. 1999, vol. 20, No. 1, 124-131.
Transparent Nanocomposites with Ultrathin, Electrospun Nylon-4,6 Fiber Reinforcement by Michel M. Bergshoef and G. Julius Vancso; *Advanced Materials* 1999, 11, No. 16, 1362-1365.
Electrospinning of Nanofibers by Thandavamoorthy Subbiah, G. S. Bhat, R. W. Tock, S. Parameswaran, S. S. Ramkumar; *Journal of Applied Polymer Science*, vol. 96, 557-569 (2005).
Polybenzimidazole Nanofiber Produced by Electrospinning by Jong-Sang Kim and Darrell H. Reneker; *Polymer Engineering and Science*, May 1999, vol. 39, No. 5, 849-854.

* cited by examiner

*Primary Examiner*—Randy Gulakowski
*Assistant Examiner*—Kyle Baumstein
(74) *Attorney, Agent, or Firm*—William J. Uhl

(57) ABSTRACT

A transparent composite article comprising a polyurethane matrix and incorporated within the matrix nanofibers having a diameter up to 5000 nanometers.

18 Claims, 2 Drawing Sheets

TRANSPARENT COMPOSITE ARTICLES

FIELD OF THE INVENTION

The present invention relates to transparent composite articles. More particularly, this invention relates to fiber-reinforced transparent composite articles.

BACKGROUND OF THE INVENTION

Polyurethane transparencies are well known for use in aircraft applications. They are used alone or in combination with other plastics or polymers such as acrylic or polycarbonate sheeting for aircraft windows and cockpit canopies. The polyurethanes are particularly useful in cockpit canopies for fighter aircraft because of their impact resistance. The properties of the polyurethanes, particularly, the scratch and mar resistance could be improved if they could be reinforced with a fibrous material, such as glass fibers. However, because of their diameters and difference in index of refraction compared to the polyurethane, the optical properties of the resultant composites would not be acceptable.

SUMMARY OF THE INVENTION

The present invention is directed to a transparent composite article comprising a polyurethane matrix and incorporated within the matrix, nanofibers having a diameter up to 5000 nanometers.

DETAILED DESCRIPTION OF THE INVENTION

Figure 1:
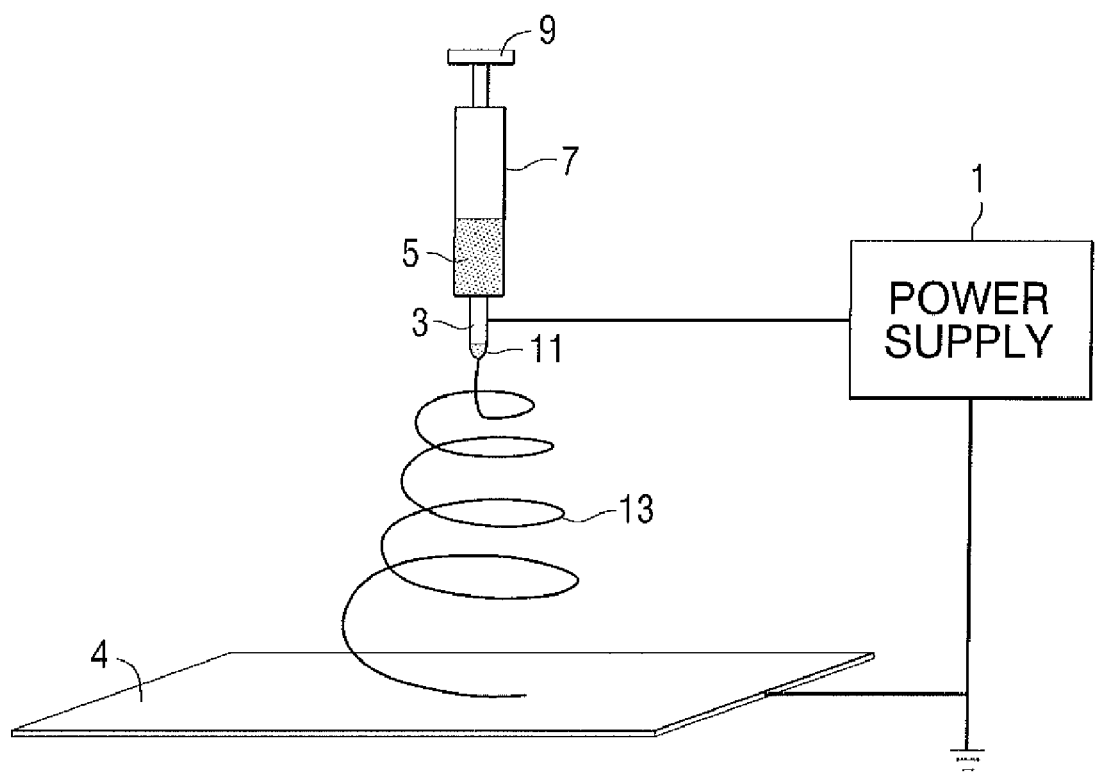
FIG. 1 depicts a basic electrospinning system.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "thermoset polymer" means a polymer that "sets" irreversibly upon curing or crosslinking. Once cured, a crosslinked thermoset polymer will not melt upon the application of heat and is insoluble in solvents.

The term "thermoplastic polymer" means a polymer that undergoes liquid flow upon heating and is soluble in solvents.

The term "polyurethane" is intended to include not only polyurethanes that are formed from the reaction of polyisocyanates and polyols but also poly(urethane-ureas) that are prepared from the reaction of polyisocyanates with polyols and polyamines.

The term "aliphatic" is meant to include cycloaliphatic

The term "polymer" is also meant to include copolymer and oligiomer.

The term "acrylic" is meant to include methacrylic and is depicted by (meth)acrylic.

The term transparent means that letter quality pica print on white paper can be read through a 0.5 cm thick layer of the composite article of the invention.

The polyurethane that forms the matrix of the composite article of the invention can be a thermoplastic or thermosetting polyurethane with thermosetting polyurethanes being preferred. The thermosetting polyurethane can be prepared by reacting a polyisocyanate with a polyol component and optionally with a polyamine in which one or all of the components have a functionality greater than 2. For example, a diisocyanate can be reacted with a polyol compound having an average functionality greater than 2, for example, a triol or higher functionality polyol, or a mixture of a triol or higher functionality polyol and a diol. Also, the polyisocyanate can have a functionality greater than 2 such as a triisocyanate and can be reacted with a polyol and optionally a polyamine having a functionality of 2 or more.

The thermosetting polyurethane can be prepared by the "one-shot" or by the "prepolymer" method. In the one-shot method, all of the reactants are charged to a reaction vessel and reacted together. In the prepolymer method, an excess of polyisocyanate is reacted with a portion of the polyol component to form an isocyanate prepolymer. The prepolymer is then reacted with the remaining polyol to form the thermosetting polyurethane.

The following exemplary monomers can be used to prepare the thermoset polyurethane: aliphatic including cycloaliphatic bifunctional isocyanates such as 1,6-hexamethylene diisocyanate and 2,2,4- and 2,4,4-trimethyl-1,6-hexane diisocyanate, bis(4-isocyanatocyclohexyl)methane, bis(3-methyl-4-isocyanatocyclohexyl)methane, 2,2-bis(4-isocyanatocyclohexyl)propane and 3-isocyanato-3,5,5-trimethylcyclohexyl isocyanate, isophorone diisocyanate or their tri or higher functionality biurets and isocyanurates, such as the isocyanurate of 1,6-hexamethylene diisocyanate and the isocyanurate of isophorone diisocyanate. Aromatic polyisocyanates such as 2,4-toluene diisocyanate or meta-phenylene diisocyanate may also be used. However, aliphatic polyisocyanates are preferred when the composite of the invention is to be exposed to visible or ultraviolet radiation.

The polyols that are to be used can be diols having from 2 to 12 carbon atoms. Aliphatic diols are preferred. Examples include ethylene glycol, 1,4-butanediol, 1,6-hexanediol, 1,10-decanediol and 2-methyl-2-n-propyl-1,3-propanediol.

Higher functionality polyols having a functionality of 3 or more, for example, from 3 to 10, can also be used. Examples of such polyols are branched aliphatic polyols having from 4 to 12 carbon atoms. Examples include trimethylolpropane, trimethylolheptane, trimethylolethane, pentaerythritol and sorbitol. Mixtures of diols and higher functionality polyols can be used. Typically, the equivalent ratio of diol to higher functionality polyol will be about 0.1 to 20:1, preferably 0.1 to 9:1 such as 1 to 5:1.

Optionally, a polyamine having a functionality of 2 or more, typically from 2 to 4, can be used with the polyol component. Examples of suitable polyamines are aliphatic polyamines having from 2 to 12 carbon atoms such as ethylenediamine and diethylenetriamine. Aromatic polyamines having from 6 to 20 carbon atoms such as various isomers of phenylenediamine and p,p-methylenedianiline can be used; however, aliphatic polyamines are preferred. The polyamines, if used, are present in amounts up to 9, preferably no more than 1 equivalent per equivalent of polyol.

Other optional reactants are polymeric polyols such as polyether polyols and polyester polyols having a number average molecular weight of from 400 to 4000; the molecular weight being determined by gel permeation chromatography using a polystyrene standard. If used, the polymeric polyol is present in amounts of about 1 to 60, such as 10 to 60, preferably 10 to 25 percent by weight based on total polyol weight.

The equivalent ratio of isocyanate to polyol plus polyamine is typically about 1:1, such as 0.9 to 1.1:1.

The composition can optionally contain a catalyst such as dibutyltin dilaurate, typically present in amounts of 0.1 to 2 percent by weight based on weight of polyurethane reactants.

The thermoset polyurethane is typically prepared by mixing the reactants and heating in a reaction vessel under vacuum to remove any entrapped gases. The reaction mixture can then be cast between two sealed and spaced apart glass plates that have been treated with a release agent. The assembly containing the polyurethane reaction mixture is then heated at a temperature of from 90 to 170° C. for about 30 minutes to 24 hours to cure the polyurethane. The assembly is then cooled and the thermoset polyurethane removed from the assembly.

The fibrous reinforcement used in the practice of the present invention are nanofibers having a diameter up to 5000, such as 5-5000, for example 50 to 1200 nanometers, preferably less than the wavelength of visible light, that is 700 nanometers or less, such as 50-700 nanometers. The fibers may have a ribbon shape and in this case diameter is intended to mean the largest dimension of the fiber. Typically the width of the ribbon shaped fibers will be up to 5000, such as 500-5000 nanometers and the thickness up to 200, such as 5 to 200 nanometers. In order to achieve transparency the nanofibers can have a diameter less 700 nanometers. For larger diameter nanofibers the composition of the nanofibers and the polyurethane matrix are selected such that difference between the respective refractive indices is low enough to insure transparency. The transparency can be expressed by a maximum haze value. Preferably the maximum haze is less than 10% preferably less than 1% as determined according to ASTM D1003. The fibers can be prepared by electrospinning a ceramic melt, a polymer melt or a polymer solution. Preferably a polymer solution is used.

Figure 2:
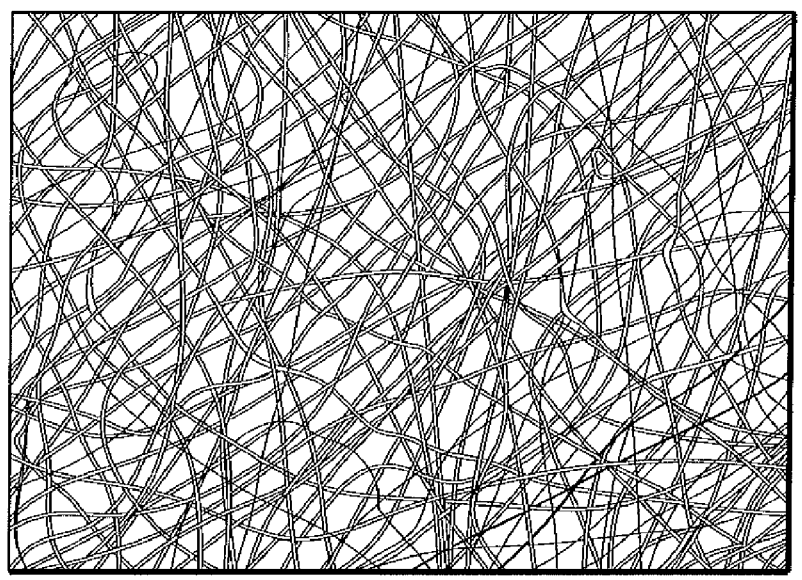
FIG. 2 simulates a scanning electron microscopic (SCM) image of a non-woven mat.

With reference to FIG. 1, the electrospinning system consists of three major components, a power supply 1, a spinneret 3 and an electrically grounded collector 4. Direct current or alternating current may be used in the electrospinning process. The polymer solution 5 is contained in a syringe 7. A syringe pump 9 forces the solution through the spinneret 3 at a controlled rate. A drop of the solution forms at the tip of the needle 11. Upon application of a voltage, typically from 5 to 30 kilovolts (kV), the drop becomes electrically charged. Consequently, the drop experiences electrostatic repulsion between the surface charges and the forces exerted by the external electric field. These electrical forces will distort the drop and will eventually overcome the surface tension of the polymer solution resulting in the ejection of a liquid jet 13 from the tip of the needle 11. Because of its charge, the jet is drawn downward to the grounded collector 4. During its travel towards the collector 4, the jet 13 undergoes a stretching action leading to the formation of a thin fiber. The charged fiber is deposited on the collector 4 as a random oriented non-woven mat as generally shown in FIG. 2.

The polymers used in the electrospinning process can be acrylic polymers. As used herein, the term "acrylic" polymer refers to those polymers that are well known to those skilled in the art which results in the polymerization of one or more ethylenically unsaturated polymerizable materials. (Meth)acrylic polymers suitable for use in the present invention can be made by any of a wide variety of methods as will be understood by those skilled in the art. The (meth)acrylic polymers can be made by addition polymerization of unsaturated polymerizable materials that contain silane groups, carboxyl groups, hydroxyl groups and amine or amide groups. Examples of silane groups include, without limitation, groups that have the structure Si-Xn (wherein n is an integer having a value ranging from 1 to 3 and X is selected from chlorine, alkoxy esters, and/or acyloxy esters). Such groups hydrolyze in the presence of water including moisture in the air to form silanol groups that condense to form —Si—O—Si— groups.

Examples of silane-containing ethylenically unsaturated polymerizable materials, suitable for use in preparing such (meth)acrylic polymers include, without limitation, ethylenically unsaturated alkoxy silanes and ethylenically unsaturated acyloxy silanes, more specific examples of which include vinyl silanes such as vinyl trimethoxysilane, acrylatoalkoxysilanes, such as gamma-acryloxypropyl trimethoxysilane and gamma-acryloxypropyl triethoxysilane, and methacrylatoalkoxysilanes, such as gamma-methacryloxypropyl trimethoxysilane, gamma-methacryloxypropyl triethoxysilane and gamma-methacryloxypropyl tris-(2-methoxyethoxy)silane; acyloxysilanes, including, for example, acrylato acetoxysilanes, methacrylato acetoxysilanes and ethylenically unsaturated acetoxysilanes, such as acrylatopropyl triacetoxysilane and methacrylatopropyl triacetoxysilane. In certain embodiments, it may be desirable to utilize monomers that, upon addition polymerization, will result in a (meth)acrylic polymer in which the Si atoms of the resulting hydrolyzable silyl groups are separated by at least two atoms from the backbone of the polymer. Preferred monomers are (meth)acryloxyalkylpolyalkoxy silane, particularly (meth)acryloxyalkyltrialkoxy silane in which the alkyl group contains from 1 to 3 carbon atoms and the alkoxy groups contain from 1 to 2 carbon atoms.

In certain embodiments, the amount of the silane-containing ethylenically unsaturated polymerizable material used in the total monomer mixture is chosen so as to result in the production of a (meth)acrylic polymer comprising silane groups that contain from 0.2 to 20, preferably 5 to 10 percent by weight, silicon, based on the weight of the total monomer combination used in preparing the (meth)acrylic polymer The (meth)acrylic polymer suitable for use in the present invention can be the reaction product of one or more of the aforementioned silane-containing ethylenically unsaturated polymerizable materials and preferably an ethylenically unsaturated polymerizable material that comprises carboxyl such as carboxylic acid groups or an anhydride thereof. Examples of suitable ethylenically unsaturated acids and/or anhydrides thereof include, without limitation, acrylic acid, methacrylic acid, itaconic acid, crotonic acid, maleic acid, maleic anhydride, citraconic anhydride, itaconic anhydride, ethylenically unsaturated sulfonic acids and/or anhydrides such as sulfoethyl methacrylate, and half esters of maleic and fumaric acids, such as butyl hydrogen maleate and ethyl hydrogen fumarate in which one carboxyl group is esterified with an alcohol.

Examples of other polymerizable ethylenically unsaturated monomers to introduce carboxyl functionality are alkyl including cycloalkyl and aryl (meth)acrylates containing from 1 to 12 carbon atoms in the alkyl group and from 6 to 12 carbon atoms in the aryl group. Specific examples of such monomers include methyl methacrylate, n-butyl methacrylate, n-butyl acrylate, 2-ethylhexyl methacrylate, cyclohexyl methacrylate and phenyl methacrylate.

The amount of the polymerizable carboxyl-containing ethylenically unsaturated monomers is preferably sufficient to provide a carboxyl content of up to 55.0, preferably 15 to 45 percent by weight based on the weight of the total monomer combination used to prepare the (meth)acrylic polymer. Preferably, at least a portion of the carboxyl groups are derived from a carboxylic acid such that the acid value of the polymer is within the range of 20 to 80, preferably 30 to 70 based on resin solids.

The (meth)acrylic polymer used in the invention also preferably contains hydroxyl functionality typically achieved by using a hydroxyl functional ethylenically unsaturated polymerizable monomer. Examples of such materials include hydroxyalkyl esters of (meth)acrylic acids having from 2 to 4 carbon atoms in the hydroxyalkyl group. Specific examples include hydroxyethyl(meth)acrylate, hydroxypropyl(meth)acrylate and 4-hydroxybutyl(meth)acrylate. The amount of the hydroxy functional ethylenically unsaturated monomer is sufficient to provide a hydroxyl content of up to 6.5, such as, 0.5 to 6.5, preferably 1 to 4 percent by weight based on the weight of the total monomer combination used to prepare the (meth)acrylic polymer.

The (meth)acrylic polymer optionally contains nitrogen functionality introduced from nitrogen-containing ethylenically unsaturated monomers. Examples of nitrogen functionality are amines, amides, ureas, imidazoles and pyrrolidones. Examples of suitable N-containing ethylenically unsaturated monomers are: amino-functional ethylenically unsaturated polymerizable materials that include, without limitation, p-dimethylamino ethyl styrene, t-butylaminoethyl(meth)acrylate, dimethylaminoethyl(meth)acrylate, diethylaminoethyl(meth)acrylate, dimethylaminopropyl(meth)acrylate and dimethylaminopropyl(meth)acrylamide; amido-functional ethylenically unsaturated materials that include acrylamide, methacrylamide, n-methyl acrylamide and n-ethyl (meth)acrylamide; urea-functional ethylenically unsaturated monomers that include methacrylamidoethylethylene urea.

If used, the amount of the nitrogen-containing ethylenically unsaturated monomer is sufficient to provide a nitrogen content of from up to 5, such as from 0.2 to 5.0, preferably from 0.4 to 2.5 percent by weight based on weight of a total monomer combination used in preparing the (meth)acrylic polymer.

Besides the polymerizable monomers mentioned above, other polymerizable ethylenically unsaturated monomers that may be used to prepare the (meth)acrylic polymer. Examples of such monomers include poly(meth)acrylates such as ethylene glycol di(meth)acrylate and trimethylolpropane tri(meth)acrylate, ditrimethylolpropane tetra(meth)acrylate; aromatic vinyl monomers such as styrene, vinyl toluene and alpha-methyl styrene; monoolefinic and diolefinic hydrocarbons, unsaturated esters of organic and inorganic acids and esters of unsaturated acids and nitriles. Examples of such monomers include 1,3-butadiene, acrylonitrile, vinyl butyrate, vinyl acetate, allyl chloride, divinyl benzene, diallyl itaconate, triallyl cyanurate as well as mixtures thereof. The polyfunctional monomers, such as the polyacrylates, if present, are typically used in amounts up to 20 percent by weight. The monofunctional monomers, if present, are used in amounts up to 70 percent by weight; the percentage being based on weight of the total monomer combination used to prepare the (meth)acrylic polymer.

The (meth)acrylic polymer is typically formed by solution polymerization of the ethylenically unsaturated polymerizable monomers in the presence of a polymerization initiator such as azo compounds, such as alpha, alpha'-azobis(isobutyronitrile), 2,2'-azobis(methylbutyronitrile) and 2,2'-azobis(2,4-dimethylvaleronitrile); peroxides, such as benzoyl peroxide, cumene hydroperoxide and t-amylperoxy-2-ethylhexanoate; tertiary butyl peracetate; tertiary butyl perbenzoate; isopropyl percarbonate; butyl isopropyl peroxy carbonate; and similar compounds. The quantity of initiator employed can be varied considerably; however, in most instances, it is desirable to utilize from 0.1 to 10 percent by weight of initiator based on the total weight of copolymerizable monomers employed. A chain modifying agent or chain transfer agent may be added to the polymerization mixture. The mercaptans, such as dodecyl mercaptan, tertiary dodecyl mercaptan, octyl mercaptan, hexyl mercaptan and the mercaptoalkyl trialkoxysilanes such as 3-mercaptopropyl trimethoxysilane may be used for this purpose as well as other chain transfer agents such as cyclopentadiene, allyl acetate, allyl carbamate, and mercaptoethanol.

The polymerization reaction for the mixture of monomers to prepare the acrylic polymer can be carried out in an organic solvent medium utilizing conventional solution polymerization procedures which are well known in the addition polymer art as illustrated with particularity in, for example, U.S. Pat. Nos. 2,978,437; 3,079,434 and 3,307,963. Organic solvents that may be utilized in the polymerization of the monomers include virtually any of the organic solvents often employed in preparing acrylic or vinyl polymers such as, for example, alcohols, ketones, aromatic hydrocarbons or mixtures thereof. Illustrative of organic solvents of the above type which may be employed are alcohols such as lower alkanols containing 2 to 4 carbon atoms including ethanol, propanol, isopropanol, and butanol; ether alcohols such as ethylene glycol monoethyl ether, ethylene glycol monobutyl ether, propylene glycol monomethyl ether, and dipropylene glycol monoethyl ether; ketones such as methyl ethyl ketone, methyl N-butyl ketone, and methyl isobutyl ketone; esters such as butyl acetate; and aromatic hydrocarbons such as xylene, toluene, and naphtha.

In certain embodiments, the polymerization of the ethylenically unsaturated components is conducted at from 0° C. to 150° C., such as from 50° C. to 150° C., or, in some cases, from 80° C. to 120° C.

The polymer prepared as described above is usually dissolved in solvent and typically has a resin solids content of about 15 to 80, preferably 20 to 60 percent by weight based on total solution weight. The molecular weight of the polymer typically ranges between 3,000 to 1,000,000, preferably 5,000 to 100,000 as determined by gel permeation chromatography using a polystyrene standard.

For the electrospinning application, the polymer solution such as described above can be mixed with water to initiate the crosslinking reaction and to build viscosity necessary for fiber formation. Typically about 5 to 20, preferably 10 to 15 percent by weight water is added to the polymer solution with the percentage by weight being based on total weight of the polymer solution and the water. Preferably a base such as a water-soluble organic amine is added to the water-polymer solution to catalyze the crosslinking reaction. Optionally a thickener such as polyvinyl pyrrolidone, polyvinyl alcohol, polyvinyl acetate, polyamides and/or a cellulosic thickener can be added to the electrospinning formulation to better control its viscoelastic behavior. If used, the thickener is present in amounts no greater than 20 percent by weight, typically from 1 to 6 percent by weight based on weight of the polymer solution.

The electrospinning formulation prepared as described above is then stored to permit the viscosity to build to the crosslinking reaction. When the viscosity is sufficiently high but short of gelation, the formulation is subjected to the electrospinning process as described above.

Typically, the viscosity should be at least 5 and less than 2,000, usually less than 1,000, such as preferably within the range of 50 to 250 centistrokes for the electrospinning process. A Bubble Viscometer according to ASTM D-1545 determines the viscosity. The time for storing the electrospinning formulation will depend on a number of factors such as temperature, crosslinking functionality and catalyst. Typically, the electrospinning formulation will be stored for as low as one minute up to two hours.

The electrospun fibers can be integrated with the polyurethane matrix using a molding process. For example the polyurethane forming reactants and chopped electrospun fibers can be injected into a mold with the fibers being dispersed throughout the polyurethane starting materials. The polyurethane could be then cured, typically by heat, the mold cooled and the composite removed from the mold.

Figure 3:
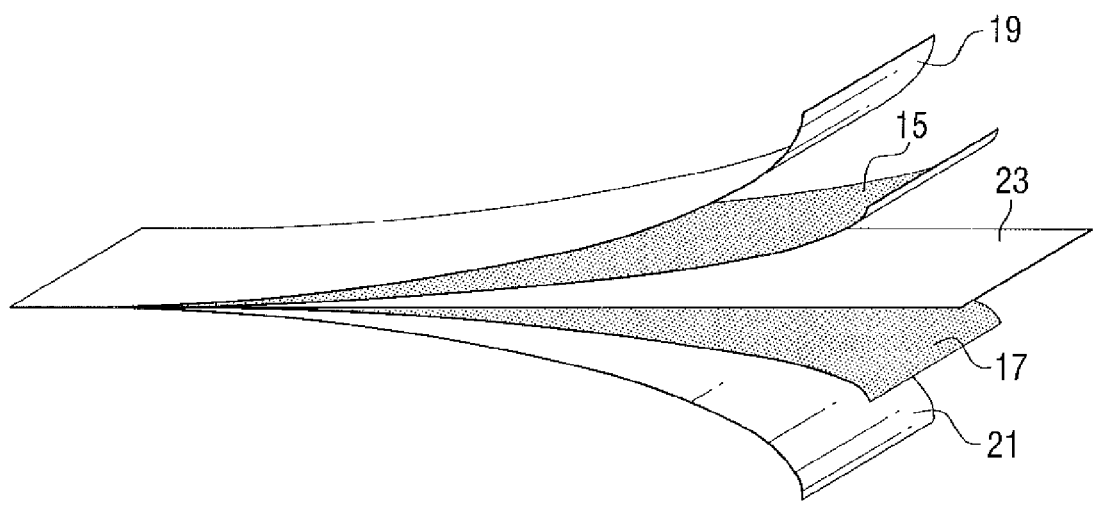
FIG. 3 depicts molding of the composite articles of the invention between glass mold walls.

Alternatively as shown in FIG. 3, the electrospun fibers can be assembled in the form of a mat 15 and 17 and secured to the interior surface of glass mold plates 1 and 3. The glass mold plates are spaced apart and sealed. The polyurethane reactants are cast between the glass mold plates and allowed to penetrate the fiber mats. The polyurethane is then cured to form the polyurethane matrix 9. The mold can then be disassembled and the transparent composite removed. Alternatively, the transparent composite can be a layer in a laminated structure such as shown by 11 in which the transparent composite is sandwiched between the two glass layers. Either or both of the glass layers could be removed and optionally replaced by another material such as acrylic or polycarbonate sheeting.

The content of the electrospun fibers in the transparent can vary depending on the method and performance properties desired. Typically, the fiber content will be from 0.5 to 80 percent by weight, based on total weight of the composite.

Preferably, the electrospun fibers are in a mat configuration and located just beneath the surface of the composite article. This can be accomplished as described above by assembling the mat on the interior surface of a mold and casting the polyurethane reactants to the mold. The concentration of the electrospun fibers will range from 0.1 to 5 such as 0.5 to 2.5 milligrams per square inch in the surface region of the polyurethane typically the top 10-50 microns from the surface The transparent composite articles are useful as transparencies for aircraft, particularly, cockpit canopies for fighter aircraft, for buses, trains and tanks. The composites can be used in ophthalmic applications such as lenses and goggles.

The following examples are presented to demonstrate the general principles of the invention. However, the invention should not be considered as limited to the specific examples presented. All parts are by weight unless otherwise indicated.

EXAMPLES A, B AND C

Synthesis of Acrylic Silane Polymers

For each of Examples A to C in Table 1, a reaction flask was equipped with a stirrer, thermocouple, nitrogen inlet and a condenser. Charge A was then added and stirred with heat to reflux temperature (75° C.-80° C.) under nitrogen atmosphere. To the refluxing ethanol, charge B and charge C were simultaneously added over three hours. The reaction mixture was held at reflux condition for two hours. Charge D was then added over a period of 30 minutes. The reaction mixture was held at reflux condition for two hours and subsequently cooled to 30° C.

TABLE 1

|  | Example A | Example B | Example C |
| --- | --- | --- | --- |
| Charge A (weight in grams) |  |  |  |
| Ethanol SDA 40B[1] | 360.1 | 752.8 | 1440.2 |
| Charge B (weight in grams) |  |  |  |
| Methyl Methacrylate | 12.8 | 41.8 | 137.9 |
| Acrylic acid | 8.7 | 18.1 | 34.6 |
| Silquest A-174[2] | 101.4 | 211.9 | 405.4 |
| 2-hydroxylethylmethacrylate | 14.5 | 0.3 | 0.64 |
| n-Butyl acrylate | 0.2 | 0.3 | 0.64 |
| Acrylamide | 7.2 | — | — |
| Sartomer SR 355[3] | — | 30.3 | — |
| Ethanol SDA 40B | 155.7 | 325.5 | 622.6 |
| Charge C (weight in grams) |  |  |  |
| Vazo 67[4] | 6.1 | 12.8 | 24.5 |
| Ethanol SDA 40B | 76.7 | 160.4 | 306.8 |
| Charge D (weight in grams) |  |  |  |
| Vazo 67 | 1.5 | 2.1 | 6.1 |
| Ethanol SDA 40B | 9.1 | 18.9 | 36.2 |
| % Solids | 17.9 | 19.5 | 19.1 |
| Acid value (100% resin solids) | 51.96 | 45.64 | 45.03 |
| Mn | — | 3021[5] | 5810 |

[1]Denatured ethyl alcohol, 200 proof, available from Archer Daniel Midland Co.
[2]gamma-methacryloxypropyltrimethoxysilane, available from GE silicones.
[3]Di-trimethylolpropane tetraacrylate, available from Sartomer Company Inc.
[4]2,2'-azo bis(2-methyl butyronitrile), available from E.I. duPont de Nemours & Co., Inc.
[5]Mn of soluble portion; the polymer is not completely soluble in tetrahydrofuran.

EXAMPLES 1, 2 AND 3

Acrylic-Silane Nanofibers

Example 1

The acrylic-silane resin solution from Example C (8.5 grams) was blended with polyvinylpyrrolidone (0.2 grams) and water (1.5 grams). The formulation was stored at room temperature for 215 minutes. A portion of the resulting formulation was loaded into a 10 ml syringe and delivered via a syringe pump at a rate of 1.6 milliliters per hour to a spinneret (stainless steel tube 1/16-inch outer diameter and 0.010-inch internal diameter). This tube was connected to a grounded aluminum collector via a high voltage source to which about 21 kV potential was applied. The delivery tube and collector were encased in a box that allowed nitrogen purging to maintain a relative humidity of less than 25%. Ribbon shaped nanofibers having a thickness of about 100-200 nanometers and a width of 500-700 nanometers were collected on the grounded aluminum panels and were characterized by optical microscopy and scanning electron microscopy.

Example 2

The acrylic-silane resin solution from Example B (8.5 grams) was blended with polyvinylpyrrolidone (0.1 grams) and water (1.5 grams). The formulation was stored at room temperature for 210 minutes. A portion of the resulting solution was loaded into a 10 ml syringe and delivered via a syringe pump at a rate of 0.2 milliliters per hour to the spinneret of Example 1. The conditions for electrospinning were as described in Example 1. Ribbon shaped nanofibers having a thickness of 100-200 nanometers and a width of 900-1200 nanometers were collected on grounded aluminum foil and were characterized by optical microscopy and scanning electron microscopy.

Example 3

The acrylic-silane resin from Example A (8.5 grams) was blended with polyvinylpyrrolidone (0.1 grams) and water (1.5 grams). The formulation was stored at room temperature for 225 minutes. A portion of the resulting solution was loaded into a 10 ml syringe and delivered via a syringe pump at a rate of 1.6 milliliters per hour to the spinneret as described in Example 1. The conditions for electrospinning were as described in Example 1. Ribbon shaped nanofibers having a thickness of 100-200 nanometers and a width of 1200-5000 nanometers were collected on grounded aluminum foil and were characterized by optical microscopy and scanning electron microscopy. A sample of the nanofiber was dried in an oven at 110° C. for two hours. No measurable weight loss was observed. This indicates the nanofibers were completely crosslinked.

Examples 4 and 5

Transparent composite articles comprising a polyurethane matrix and electrospun fibers of Example 3 were prepared as follows:

For each of Examples 4 and 5, see Table 2 below, a reaction vessel was equipped with a stirrer, thermocouple, nitrogen inlet, distillation container and vacuum pump. Charge A was then added and stirred with heating to 80° C.-100° C. under vacuum and held for 1 hour. The reaction mixture was then cooled to 80° C., vacuum turned off and Charge B was added to the vessel. The reaction mixture was then heated to 80° C. under vacuum and allowed to exotherm from 110° C.-120° C. The reaction mixture was then cast in place between two 5 inch by 5 inch by three sixteenths inch float glass plates which were fitted with gaskets on three sides and held together using clamps. Both glass plates had a silane release coating on their faces that contacted the electrospun fibers and the polyurethane. The fibers were spun over the treated plates before assembling them into a casting cell. The casting cell was assembled with the electrospun nanofiber covered plate on the inside of the casting cell. The spacing between the plates was approximately three sixteenths of an inch. The casting cell was preheated to a temperature of about 120° C. before casting. After casting, the assemblies were given a 24 hour cure at 120° C. and then a 16 hour cure at 143° C. After curing was complete, the cells were given a two hour gradual cool down cycle from the 143° C. temperature to 45° C. while remaining in the oven. The cells were removed from the oven and the glass plates were separated from the composite article.

Polyurethane Examples 4 and 5

TABLE 2

|  | Example 4 | Example 5 |
|---|---|---|
| Charge A (weight in grams) |  |  |
| 1,4 Butanediol | 31.54 | — |
| 1,10 Decanediol | — | 61.00 |
| Trimethylolpropane | 13.41 | 13.41 |
| Charge B (weight in grams) |  |  |
| Desmodur W[1] | 131.00 | 131.00 |

[1]Bis(4-isocyanatocyclohexyl)methane from Bayer Material Science.

Each composite article was tested for scratch resistance by subjecting the composite to scratch testing by linearly scratching the surface with a weighted abrasive paper for ten double rubs using an Atla ATCC Scratch Tester, Model CM-5, available from Atlas Electrical Devices Company of Chicago, Ill. The abrasive paper used was 3M 281Q WETORDRY™ PRODUCTION™ 9 micron polishing paper sheets, which are commercially available from 3M Company of St. Paul, Minn.

After completing the scratch-test with a Crockmeter using a 9-µm abrasive, the increase in the average roughness in the surface of the scratched area was measured using an optical profilometer. The surface of the scratched area was scanned perpendicular to the direction on the Crockmeter scratching; that is, across the scratches. An identical scan was taken in an unscratched area to measure average roughness of the surface of the original article. Change in average surface roughness for each article was calculated by subtracting the average roughness of the unscratched surface from the average roughness of the scratched surface. Transparent articles with no nanofibers were compared with transparent composite articles containing electrospun fibers from Example 3.

Also, for the purpose of comparison, composite articles were prepared as generally described above for Example 5 but in which polyvinylidene fluoride (KYNAR) and nylon-6 fibers were electrospun and used in place of the fibers of Example 3. The composite articles were evaluated for scratch resistance as described above The results of the testing are reported in Table 3 below.

TABLE 3

| Example | Electrospun Fibers | Change in average surface roughness (nm) |
|---|---|---|
| Control | None | 74.54 |
| Example 4 | Example 3 | 6.93 |
| Example 4 (repeat) | Example 3 | −7.28 |
| Control (repeat) | None | 81.48 |
| Example 5 | Example 3 | −4.91 |
| Comparative | KYNAR | 90.2 |
| Comparative | Nylon-6 | 66.96 |

The results reported in Table 3 show the improvement in scratch resistance provided by the acrylic-silane electrospun fibers.

Whereas particular embodiments of this invention have been described above for purposes of illustration, it will be evident to those skilled in the art that numerous variations of the details of the present invention may be made without departing from the invention as defined in the appended claims.

What is claimed is:

1. A transparent composite article having a maximum haze value less than 10% comprising:
   (a) a polyurethane matrix and incorporated within the matrix
   (b) nanofibers having a diameter of 50 to 5000 nanometers, the nanofibers being a crosslinked (meth)acrylic polymer containing silane groups that have reacted with moisture.

2. The article of claim 1 in which the polyurethane is a thermoset.

3. The article of claim 1 in which the polyurethane is aliphatic polyurethane.

4. The article of claim 2 in which the polyurethane is prepared from reacting:
   (a) a diisocyanate with
   (b) a polyol having an average functionality greater than 2.

5. The article of claim 4 in which the polyol is a mixture of polyols comprising:
   (a) a polyol having a functionality of at least 3,
   (b) a polyol having a functionality of 2.

6. The article of claim 5 in which
   (a) is a branched aliphatic polyol having from 4 to 12 carbon atoms, and
   (b) is a diol having from 2 to 12 carbon atoms.

7. The article of claim 2 in which the polyurethane is prepared from reacting
   (a) a polyisocyanate having a functionality greater than 2 with
   (b) a polyol having an average functionality of 2 or more.

8. The article of claim 7 in which the polyisocyanate has a functionality of 3 or more.

9. The article of claim 7 in which
   (a) is an aliphatic triisocyanate,
   (b) is an aliphatic polyol comprising a diol having from 2 to 12 carbon atoms and a branched aliphatic polyol having a functionality of at least 3 and containing from 4 to 12 carbon atoms.

10. The article of claim 1 in which the fibers are prepared by an electrospinning process.

11. The article of claim 1 in which the crosslinked polymer is derived from a polymer, containing silane groups, and groups selected from carboxyl and hydroxyl.

12. The article of claim 1 in which the crosslinked polymer is derived from a polymer that contains silane groups, carboxyl groups, hydroxyl groups and nitrogen-containing groups.

13. The article of claim 11 in which the silane groups are present in the polymer in amounts of 0.2 to 20 percent by weight silicon based on total polymer weight.

14. The article of claim 12 in which the polymer contains from
   (a) 0.2 to 20 percent by weight silane groups, measured as silicon,
   (b) 1 to 45 percent by weight carboxyl groups,
   (c) 0.5 to 6.5 percent by weight hydroxyl groups, and
   (d) 0.2 to 5.0 percent by weight nitrogen-containing groups;
the percentages by weight being based on total polymer weight.

15. The article of claim 10 in which the polymer undergoes a crosslinking reaction during the electrospinning process.

16. The article of claim 1 in the form of a transparency for aircraft, trains, buses or tanks.

17. The article of claim 1 in the form of a transparency for ophthalmic applications.

18. The article of claim 16 in the form of a transparency for an aircraft cockpit.

* * * * *

UNITED STATES PATENT AND TRADEMARK OFFICE
CERTIFICATE OF CORRECTION

| | | |
|---|---|---|
| PATENT NO. | : 7,632,563 B2 | Page 1 of 1 |
| APPLICATION NO. | : 11/610755 | |
| DATED | : December 15, 2009 | |
| INVENTOR(S) | : Stuart D. Hellring et al. | |

It is certified that error appears in the above-identified patent and that said Letters Patent is hereby corrected as shown below:

Title Page; item (75);

Please correct the spellings in these Inventor surnames:

From "Thomas G. Rakavina" to --Thomas G. Rukavina--; and from "Victoria A. Trette" to --Victoria A. Trettel--.

Signed and Sealed this

Fourth Day of January, 2011

David J. Kappos
*Director of the United States Patent and Trademark Office*